United States Patent [19]

Arp

[11] Patent Number: 4,717,078
[45] Date of Patent: Jan. 5, 1988

[54] EYEBALL FITTING FOR INCREASING FLOW OF RETURN WATER TO SWIMMING POOL

[76] Inventor: George F. Arp, 27 Terrace Villa Cir., Fairport, N.Y. 14450

[21] Appl. No.: 911,334

[22] Filed: Sep. 25, 1986

Related U.S. Application Data

[63] Continuation-in-part of Ser. No. 642,575, Aug. 20, 1984, abandoned.

[51] Int. Cl.$^4$ .................. B05B 15/08; F16L 27/06
[52] U.S. Cl. ........................... 239/550; 4/492; 4/541; 239/587; 285/271
[58] Field of Search .............. 239/587, 428.5, 265.35, 239/550; 4/541–543, 492, 490; 128/66; 285/261, 271

[56] References Cited

U.S. PATENT DOCUMENTS

| | | | |
|---|---|---|---|
| 201,689 | 3/1878 | Leermo | 285/261 X |
| 1,057,939 | 4/1913 | Cooper | 285/261 |
| 2,175,191 | 10/1939 | Goyette | 285/261 X |
| 3,931,992 | 1/1976 | Coel | 285/271 X |
| 4,262,371 | 4/1981 | Berry et al. | 4/492 X |
| 4,264,039 | 4/1981 | Moreland | 128/66 X |
| 4,335,854 | 6/1982 | Reynoso | 4/542 X |
| 4,422,191 | 12/1983 | Jaworski | 4/492 X |

*Primary Examiner*—Andres Kashnikow
*Attorney, Agent, or Firm*—Stonebraker, Shepard & Stephens

[57] ABSTRACT

An eyeball fitting 10 for directing return water into a swimming pool has an eyeball 20 with a smooth and even inside surface 25 curving continuously from an entrance opening 26 to a discharge opening 21 having a sharp edge 22. The curvature of inside surface 25 has a radius that gradually increases as inside surface 25 gradually diminishes in cross-sectional area proceeding from larger diameter entrance opening 26 to smaller diameter discharge edge 22. Fitting 10 includes a seat 30 having a spherical recess 33 to receive a spherical outside surface 24 of eyeball 20, and seat 30 has an internal surface 35 continuously curving at a gradually increasing radius of curvature proceeding from an entrance side toward the spherical recess 33.

11 Claims, 10 Drawing Figures

4,717,078

EYEBALL FITTING FOR INCREASING FLOW OF RETURN WATER TO SWIMMING POOL

RELATED APPLICATIONS

This application is a continuation-in-part of my parent application Ser. No. 642,575, filed 20 Aug. 1984, now abandoned, entitled EYEBALL FITTING FOR SWIMMING POOL RETURN WATER, and abandoned upon the filing of this Continuation-In-Part application.

BACKGROUND

Eyeball fittings are used to direct return water into a swimming pool. They have spherical exteriors so they can be turned to different angular orientations within a spherical seat in which they are held by a retainer ring. Water flows through their hollow interiors and out through a discharge opening that directs the water in a desired flow pattern within the pool.

While studying water flow through chlorinators arranged in swimming pool return lines, I discovered that the available eyeball fittings substantially constrict the water flow rate. This led to a closer examination of the eyeballs, revealing that they have hollow interiors leading to a wall at their discharge sides, with different diameter discharge openings formed in the wall. Such a construction creates substantial turbulence and significantly impedes the water flow. One brand of eyeball fitting adds an inner piece that fits within the discharge opening, reducing its size but streamlining the flow through path. This works somewhat better.

I then devised an eyeball fitting to maximize the through flow, not only making an inline chlorinator work better, but also improving the overall efficiency of the pool water filtration system. My eyeball fitting includes a more efficient eyeball that can replace the inefficient eyeballs in existing fittings, and it also includes a seat and a retainter ring combining to form a complete eyeball fitting. By increasing the water flow rate, my eyeball fitting can reduce the operating time for the pump and filter and thus reduce the energy cost of operating a pool. The larger flow rate through my eyeball fitting also directs a more vigorous steam of return water into a desired flow pattern within the pool.

SUMMARY OF THE INVENTION

My eyeball fitting includes an eyeball having a spherically shaped outside surface allowing it to be set at different angular orientations held by a retainer ring for directing return water into a swimming pool. Its opposite entrance and discharge sides have respective concentric entrance and discharge openings connected by an inside surface. The discharge opening has a sharp edge where return water leaves the eyeball and enters the swimming pool. The inside surface is smooth and even within the eyeball with no discontinuities or abrupt changes. The inside surface also curves continuously from the larger diameter entrance opening to the smaller diameter discharge opening in a curvature that gradually increases in radius as the inside surface gradually reduces in cross-sectional flow area proceeding from the entrance opening to the sharp discharge edge. A seat ring for my eyeball fitting has an internally curved entrance side leading to an exit side with a spherically shaped recess for receiving the spherical outside surface of the eyeball. The entrance side is smooth, even, and continuously curved at a gradually increasing radius of curvature proceeding from the entrance side toward the spherical recess.

DRAWINGS

DETAILED DESCRIPTION

Figure 1:
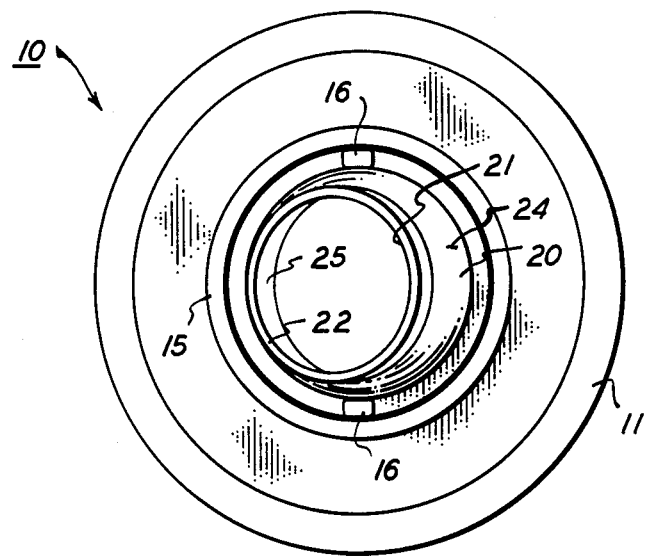
FIG. 1 is a front elevational view of a preferred embodiment of my eyeball fitting mounted at an angular inclination.

My eyeball fitting 10 includes an eyeball 20 resting in seat 30 where it is held by a retainer ring 15 having thumb and finger projections 16 for screwing in threads 17. Seat ring 30 can drop into the inside of a fixture 11 ahead of retainer ring 15, and seat 30 and ring 15 can fit new and many existing return water fixtures.

Figure 10:
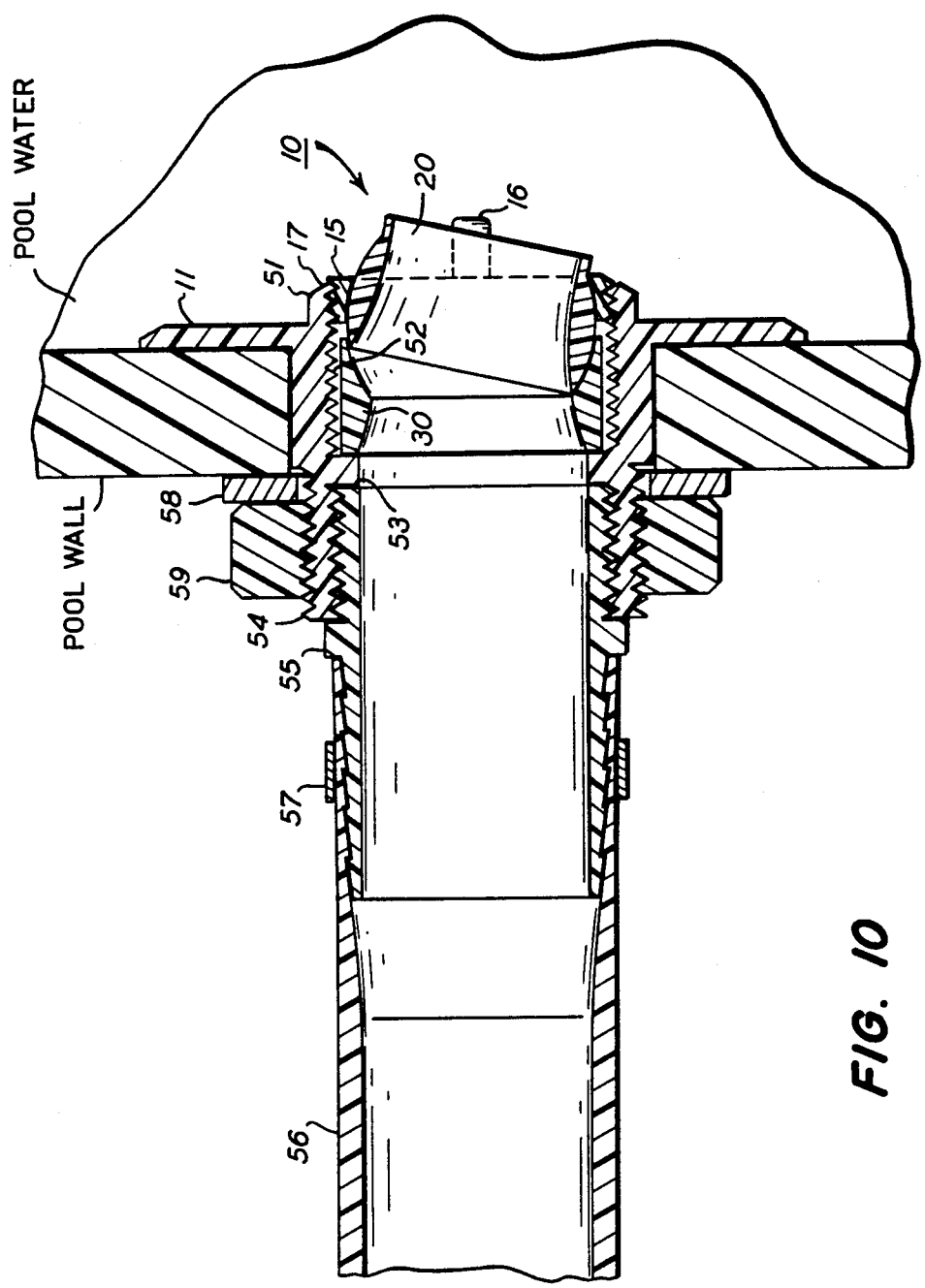
FIG. 10 is a cross-sectional view of the eyeball fitting of FIG. 1 mounted within a fixture at a discharge end of a return line.

The generally known environment of fixture 11, mounting eyeball fitting 10, is illustrated in FIG. 10. The output end 51 of fixture 11 has internal threads 52 in which seat ring 30 can be either screwed or removably fitted, as illustrated. Threads 17 of retainer ring 15 screw into threads 52 at output end 51 of fixture 11 to retain eyeball 20 in place and, for the illustrated arrangement, to also retain seat ring 30 against internal abutment 53. The input end 54 of fixture 11 has internal threads receiving connector 55 to which return line 56 is fastened with clamp 57. Full water flow through return line 56 passes through connector 55 and into fixture 11 where it flows through seat ring 30 and into the entrance opening 26 of eyeball 20. Many other known configurations of fixture 11 can also accommodate my eyeball fitting.

Eyeball 20 can replace existing eyeballs in conventional fittings and substantially increase the water flow rate. The combination of seat 30 and eyeball 20 further increases the water flow rate, and ball 20 and seat 30 can both be substituted in some existing fixtures. By using a suitable fixture 11, my complete eyeball fitting, including ball 20, seat ring 30, and retainer ring 15, can be mounted at the discharge end of any return line 56.

Figure 2:
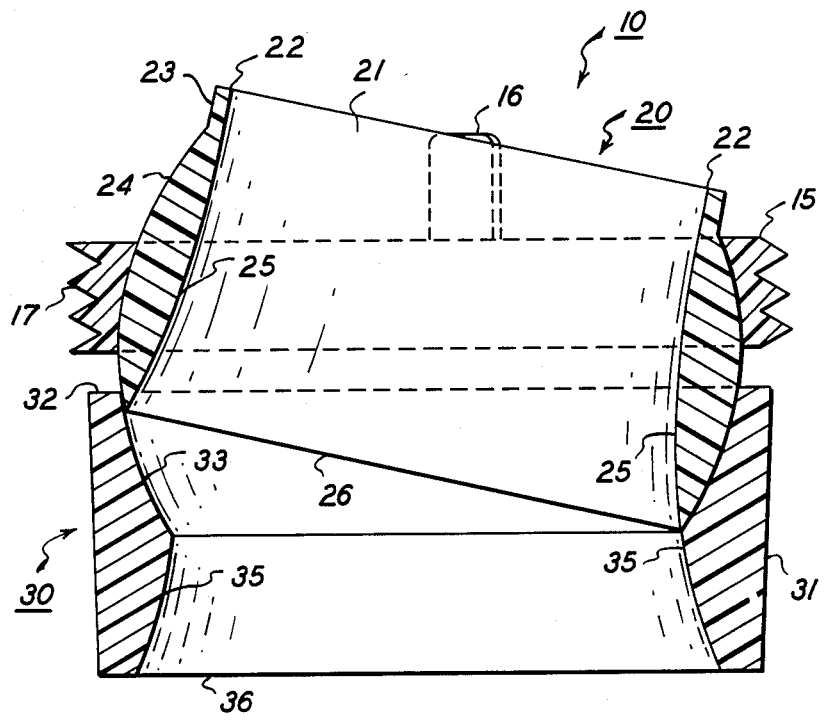
FIG. 2 is a cross-sectional view of the eyeball fitting of FIG. 1, removed from its fixture and taken along the line 2—2.

Eyeball 20 has a spherical exterior surface 24 sized to fit the spherical seats of existing eyeball fittings so that eyeball 20 can replace less efficient eyeballs. It preferably has an annular surface 23 arranged concentrically around discharge opening 21 on the discharge side of eyeball 20. Annular surface 23 is positioned to engage retainer ring 15 to limit the angular orientation of eyeball 20 as best shown in FIGS. 1 and 2.

Discharge opening 21 can vary in size as shown in FIGS. 3–8; but at any size, discharge opening 21 has a sharp discharge edge 22 where return water leaves eyeball 20 and enters a swimming pool. Any rounding, beveling, or irregularity reducing the sharpness of edge 22, as is common with prior art eyeball fittings, causes turbulence and reduces the through flow rate.

Entrance opening 26 on the entrance side of eyeball 20 is concentric with discharge opening 21 and has a diameter preferably as large as the pipe 56 leading to the eyeball fitting to accommodate maximum input flow. Since most pool return lines have an inside diameter of 1½ inches, entrance opening 26 is preferably 1½ inches in diameter, which is substantially larger than entrance openings of prior art eyeballs at about 1⅛ inches. Entrance opening 26 is also larger than discharge opening 21.

Inside surface 25 smoothly and evenly curves from entrance opening 26 to discharge opening 21. It has a high surface finish and no discontinuities or abrupt changes, so that it minimizes turbulence in the flowing water.

Figure 3:
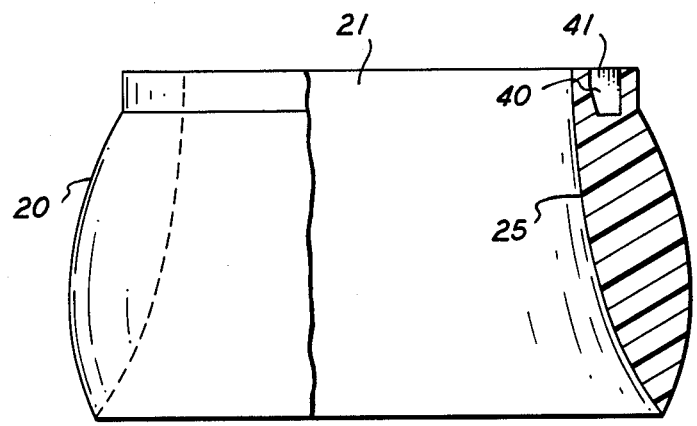
FIGS. 3–5 are partially cross-sectional views of three different sizes of eyeballs for my eyeball fitting.
Figure 4:
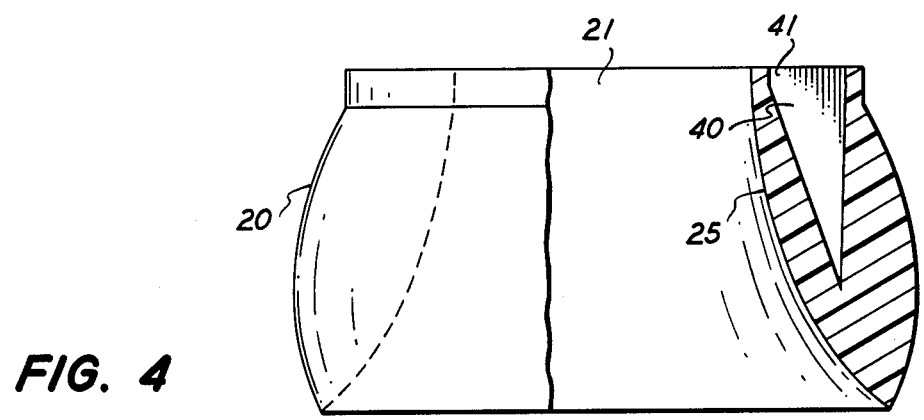
Figure 5:
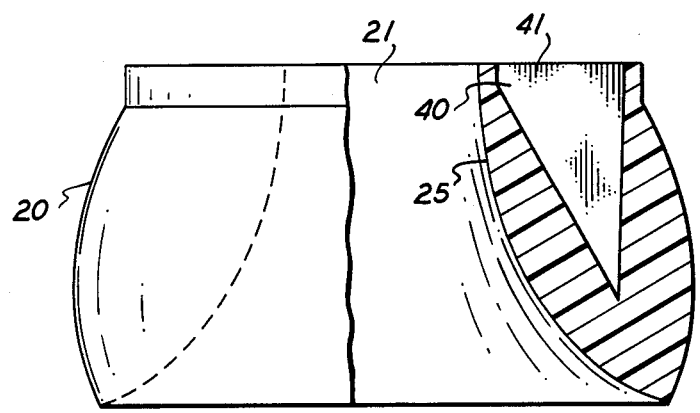
Figure 6:
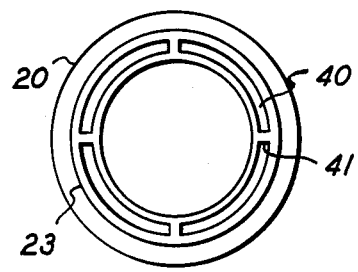
FIGS. 6–8 are respective front elevational views of the different size eyeballs of FIGS. 3–5.
Figure 7:
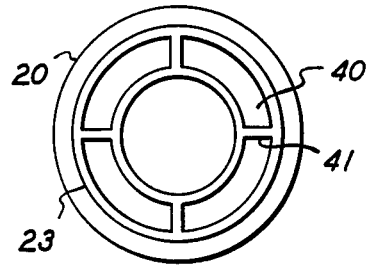
Figure 8:
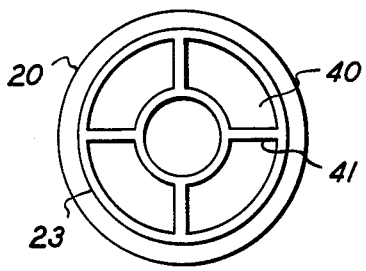

Inside surface 25 is also continuously curved from entrance opening 26 to discharge opening 21, and the curvature of inside surface 25 has a radius that gradually increases as surface 25 gradually reduces in cross-sectional flow area proceeding from entrance opening 26 to sharp discharge edge 22. Making the radius of curvature increase continuosuly from entrance opening 26 to discharge edge 22 makes inside surface 25 curve continuously all the way to discharge edge 22. Specific radii of curvature of inside surface 25 vary, depending on the size of discharge opening 21, because entrance opening 26 is preferably always sized to the 1½ inch maximum for receiving water inflow. As shown in FIGS. 3-5, this makes the minimum radii of curvature at the eyeball entrance openings smaller for eyeballs with smaller discharge openings and larger for eyeballs with larger discharge openings. Although curvature radii vary for different sizes of discharge openings 21, the radius of curvature for each size of inside surface 25 gradually increases from larger diameter entrance opening 26 to smaller diameter discharge edge 22.

Hollow regions 40 extend inward from the discharge side of eyeball 20 between discharge edge 22 and annular surface 23 for all eyeballs 20 that have smaller discharge openings than the maximum opening illustrated in FIG. 2. Radial spokes 41 extend across hollow regions 40, which extend to different depths, depending on the size of discharge region 21 for each eyeball 20. Hollows 40 reduce the amount of resin required, lighten the weight, and speed up the molding of eyeballs 20.

Seat ring 30 preferably has a cylindrical outside surface 31 sized to fit into many existing return line fixtures 11 used in constructing swimming pool return lines. Its entrance opening 36 on its entrance side is preferably somewhat larger than entrance opening 26 for eyeball 20. Internal surface 35 leads from entrance opening 36 to an exit side 32 having a spherically shaped recess 33 with a diameter smaller than entrance opening 36. Spherical exterior surface 24 of eyeball 20 fits within spherical recess 33 in seat 30, within which eyeball 20 is movable to varying angular orientations.

Internal surface 35 at the entrance side of seat ring 30 is smooth, even, and continuously curved at a gradually increasing radius of curvature and a gradually diminishing cross-sectional area proceeding from entrance opening 36 to spherical recess 33. The curvature of internal surface 35 is shaped for smoothly joining and continuing into the curvature of inside surface 25 of eyeball 20 having a maximum size discharge opening 21 set at a maximum angular orientation in seat 30 as shown in FIG. 2. This smoothly and continuously joins the curvatures of seat surface 35 and eyeball surface 25 along the inside of the bend that through flowing water follows in curving toward the angular orientation of discharge opening 21. The inside of the water flow bend is the most important surface to keep smooth and even, as the outside of the water flow bend naturally allows more flow room. For eyeballs 20 with smaller discharge openings 21, the curvatures of seat surface 35 and eyeball surface 25 do not flow continuously together as shown in FIG. 2.

Figure 9:
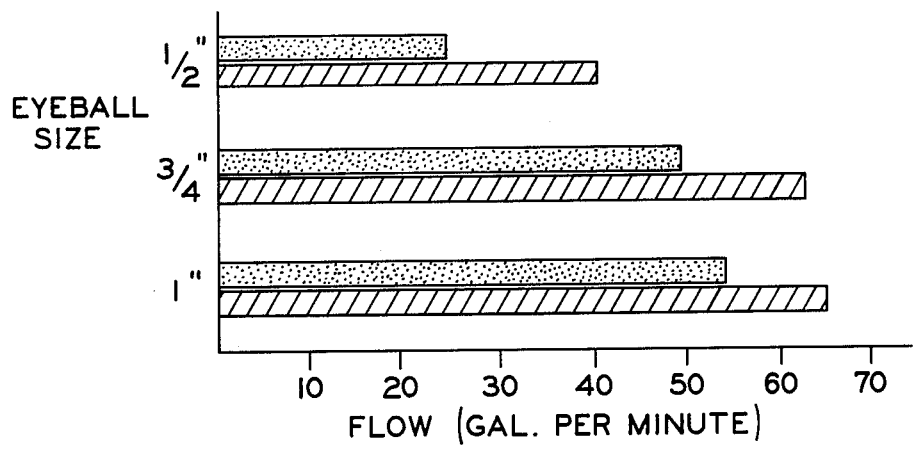
FIG. 9 is a bar graph of test results showing how my eyeball fitting improves over prior art eyeball fittings.

I have extensively tested the comparative performance of my eyeball fitting and prior art eyeball fittings, using test arrangements having conventional swimming pool pumps and filters and realistically simulated return lines. My eyeball fitting consistently outperforms prior art fittings by producing larger gallons per minute flow rates as shown in FIG. 9 for each standard size of eyeball. Measurement of the electric current drawn by the pump confirms the higher flow rates of my eyeball fittings by indicating more efficient pumping. Pressure measurements also confirm higher flow rates through my eyeball fittings by indicating lower back pressures at the pump, filter, and return line.

Increased flow rate through my eyeball fittings benefits pool operation in several ways. The pump is more efficient and moves more water for the energy input. Filtration is also more efficient because of cycling the pool water through the filter at a faster rate. The higher filtration flow rate can reduce the duty cycle and the energy cost of operating the pool because the pump and filter can run for a shorter time interval each day. Automatic chlorinators in pool return lines also work more efficiently at high flow rates to ensure proper chlorination. Finally, a larger flow rate through an eyeball fitting directs a more vigorous return water jet for swirling the pool water.

I claim:

1. An eyeball fitting for increasing the flow of return water into a swimming pool, said eyeball fitting being arranged in a fixture at the discharge end of a return line and including an eyeball having a spherically shaped outside surface allowing said eyeball to be set at variable angular orientations held in a spherical seat by a retainer, opposite entrance and discharge sides of said eyeball having respective concentric entrance and discharge openings connected by an inside surface through which return water flows to be discharged through said discharge opening into said swimming pool, said eyeball fitting comprising:
   a. said spherical seat being formed in a ring that is removably positioned within said fixture to surround full water flow from said return line flowing through said ring and into said eyeball set within said spherical seat;
   b. said ring fitting loosely inside of internal threads within said fixture and resting against an internal abutment within said fixture;
   c. said entrance opening of said eyeball having a diameter approximately equal to the inside diameter of said return line supplying said return water to said eyeball fittng, and said discharge opening of said eyeball having a diameter less than said entrance opening diameter;
   d. said inside surface of said eyeball being continuously curved from said entrance opening to said discharge opening;
   e. the curvature of said inside surface having a radius that continuously increases as said inside surface proceeds from said entrance opening to said discharge opening; and f. said retainer being threaded into said internal threads of said fixture so that an inside surface of said retainer engages said eyeball and presses said eyeball into said spherical seat in said ring, which in turn presses against said internal abutment.

2. The eyeball fitting of claim 1 wherein said ring has an internal shape forming an entrance side that curves as it approaches said spherical seat, and the curvature of said entrance side of said ring is at a radius that continuously increases as said entrance side approaches said spherical seat.

3. The eyeball fitting of claim 1 including a set of said eyeballs, each of said eyeballs of said set having the same entrance opening diameter, the same spherically shaped outside surface adapted for fitting in said spherical seat, and differing diameters of said discharge opening, and one of said eyeballs of said set being fitted in said seat.

4. A system for increasing the flow of return water into a swimming pool, said system including a spherical seat arranged in a fixture at the discharge end of a return line, and said system comprising:
 a. a plurality of eyeballs each having different diameter discharge openings and each having the same size of spherical outside surface adapted for fitting in varying angular orientations in said spherical seat where a selected one of said eyeballs is held by a retainer;
 b. said spherical seat being formed in a ring arranged loosely inside of internal threads of said fixture against an internal abutment within said fixture;
 c. all of said eyeballs having entrance openings with diameter approximately equal to the inside diameter of said return line supplying said return water to said eyeball;
 d. all of said eyeballs having inside surfaces that continuously curve from said entrance openings to said different diameter discharge openings;
 e. said curvatures of said inside surfaces each having a radius that continually increases as said inside surfaces proceed from said entrances to said discharge openings;
 f. said continually increasing radii of said inside surfaces having minimum values at said entrance openings that are smaller for smaller diameters of said discharge openigns and larger for larger diameters of said discharge openings; and
 g. said retainer being screwed into said internal threads of said fixture to press said eyeball against said ring and press said ring against said internal abutment.

5. The system of claim 4 wherein said ring has an internal shape forming an entrance side that curves inward as it approaches said spherical seat.

6. The system of claim 5 wherein the curvature of said entrance side of said ring is at a radius that continuously increases as said entrance side approaches said spherical seat.

7. An eyeball fitting for increasing the flow of return water into a swimming pool, said eyeball fitting including a spherical seat arranged within a fixture in a discharge end of a return line for receiving an eyeball having a spherical outside surface fitting said seat, said eyeball fitting comprising:
 a. said spherical seat being formed in a removable ring loosely fitting within internal threads in an output side of said fixture to seat against an internal abutment within aid fixture, and said ring having an entrance surface upstream of said spherical seat;
 b. said entrance surface being smoothly curved at a continuously increasing radius of curvature proceeding toward said spherical seat;
 c. said eyeball having a smoothly curved inside surface curving at a radius that continuously increases as said inside surface proceeds from an entrance opening of said eyeball to a discharge opening of said eyeball; and
 d. a retainer screwed into said internal threads to press said eyeball into said spherical seat and press said ring against said internal abutment.

8. The eyeball fitting of claim 7 wherein said entrance opening for said eyeball has a diameter approximately equal to the inside diameter of said return line supplying said return water to said eyeball fitting.

9. The eyeball fitting of claim 7 including a set of said eyeballs having the same spherically shaped outside surface fitting in said spherical seat, the same entrance opening diameter, and differing diameters of said discharge opening, a selected one of said eyeballs from said set being arranged in said spherical seat in said fitting.

10. The eyeball fitting of claim 9 wherein said entrance openings for said eyeballs all have a diameter approximately equal to the inside diameter of said return line supplying said return water to said eyeball fitting.

11. The eyeball fitting of claim 9 wherein said continually increasing radii of said inside surfaces have minimum values at said entrance openings that are smaller for smaller diameters of said discharge openings and larger for larger diameters of said discharge openings.

* * * * *